United States Patent [19]

Mason

[11] 4,441,753
[45] Apr. 10, 1984

[54] AIRFOILS FOR LAND VEHICLES

[75] Inventor: Stuart V. Mason, Biggleswade, England

[73] Assignee: Paul Forster, Surrey, England

[21] Appl. No.: 306,476

[22] Filed: Sep. 28, 1981

[30] Foreign Application Priority Data

May 11, 1981 [GB] United Kingdom ............... 8114365

[51] Int. Cl.³ .......................................... B60R 27/00
[52] U.S. Cl. .................................................. 296/1 S
[58] Field of Search ......................................... 296/1 S

[56] References Cited

U.S. PATENT DOCUMENTS 2,933,344  4/1960  Shumaker ............................ 296/1 S
3,596,974  8/1971  Adams ................................. 296/1 S

FOREIGN PATENT DOCUMENTS 1315182  4/1973  United Kingdom .
1520554  8/1978  United Kingdom .
2021059 11/1979  United Kingdom .
1576811 10/1980  United Kingdom .

Primary Examiner—Robert R. Song
Attorney, Agent, or Firm—Brumbaugh, Graves, Donohue & Raymond

[57] ABSTRACT

An airfoil member for a land vehicle in particular for fixing to the roof of a cab of a tractor-trailer rig, in which the airfoil member is provided to reduce drag when positioned substantially horizontally for the case where either there is no trailer unit or the height of the trailer unit is lower than that of the cab of the tractor unit. The airfoil member is also movable between a position in which it acts as an air deflector and a position in which it acts as an airfoil. The airfoil member has a pair of side portions and a central portion having a much thinner cross-section in order to reduce its weight. Its height above the roof of the cab can also be adjusted so that it can be set to the best suited position either as an air deflector or an airfoil in order to reduce drag to a minimum.

3 Claims, 3 Drawing Figures

AIRFOILS FOR LAND VEHICLES

FIELD OF THE INVENTION

The present invention relates to airfoils for land vehicles.

DESCRIPTION OF THE PRIOR ART

Wind deflectors or drag reducers (as they are sometimes known) for land vehicles are well known.

The majority of the known air deflectors are fixed structures arranged on top of the cab of the tractor of a tractor-trailer rig. In these days when large articulated vehicles up to 44 metric tons are permitted to travel on the roads in the countries of the European Economic Community, it is important from the point of view of fuel economy to reduce the drag that the upper part of the front of the trailer exerts on the combined tractor-trailer rig due to wind resistance.

One type of fixed air deflector for reducing this drag due to wind resistance is disclosed in British Patent Specification No. 1,544,478. This air deflector is in the form of a curved plate which is secured to the rear part of the roof of the cab of the tractor unit. The wind is deflected upwards, with the result that the majority passes over the top of the roof of the trailer unit so that the top front section thereof experiences a reduced amount of wind resulting in reduced drag on the combined tractor-trailer rig as a whole.

An adjustable type of air deflector is disclosed in British Patent Specification No. 1,520,554. This type is fixed at the front and has two adjustable struts which connect it to the roof of the cab at the rear.

The use of airfoils on land vehicles is also well known, but their use is not intended to reduce drag, but on the contrary to stabilize the vehicle. For example, it is well known to use an airfoil on the rear of a racing car in order to apply weight to the rear wheels of the car when cornering. It is also well known to use an airfoil on the top of a car towing a caravan, but the airfoil is used as a deflector and not an airfoil in the strict sense. Such a deflector is shown in British Patent Specification No. 1,315,182. The airfoil is fixed at an angle of substantially 45° to the horizontal to deflect air upwards over the top of the caravan.

One of the problems encountered with modern tractor-trailer rigs is that when the tractor is driven without the trailer or when the height of the trailer is less than the cab of the tractor, the air deflector unless dismantled will actually increase the drag.

SUMMARY OF THE INVENTION

It is therefore an object of the present invention to overcome partially or wholly the above disadvantage.

According to the present invention there is provided an airfoil member having means for fixing it to the roof of a land vehicle whereby said airfoil member acts to reduce drag when positioned substantially horizontally.

Preferably, means may be included for adjusting the angle of inclination of said airfoil member in relation to the roof of the land vehicle so that it can either act as an airfoil or an air deflector.

Preferably said airfoil is provided with a central portion having a thinner cross-section towards the trailing edge thereof, than adjoining side portions.

Adjustable clamp means are preferably provided in order to adjust the airfoil member between the two positions of wind deflector and airfoil

BRIEF DESCRIPTION OF THE DRAWINGS

The present invention will now be described in greater detail by way of example with reference to the accompanying drawings, wherein.

DESCRIPTION OF THE PREFERRED EMBODIMENT

Figure 1:
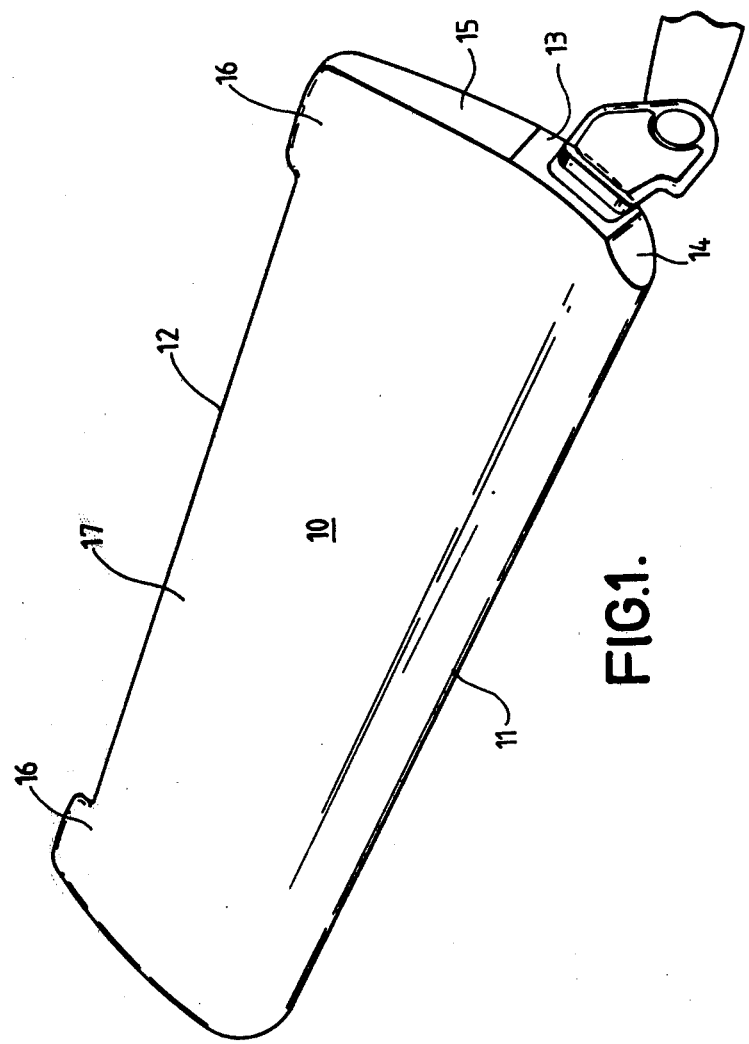
FIG. 1 is a perspective view of one preferred form of airfoil device for mounting on the roof of the cab of the tractor unit of a tractor-trailer rig.
Figure 2:
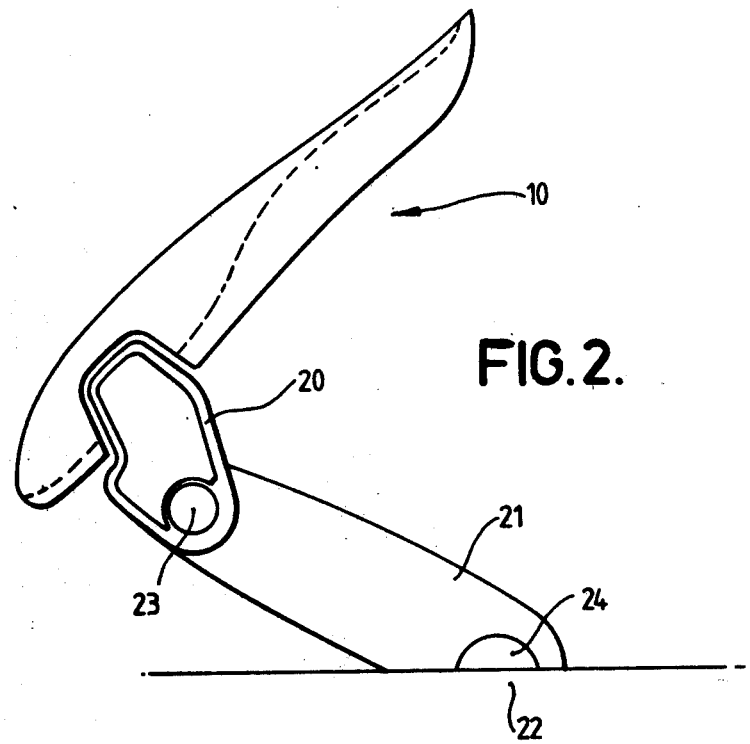
FIG. 2 is a diagrammatic side view of the airfoil device when used as an air deflector.
Figure 3:
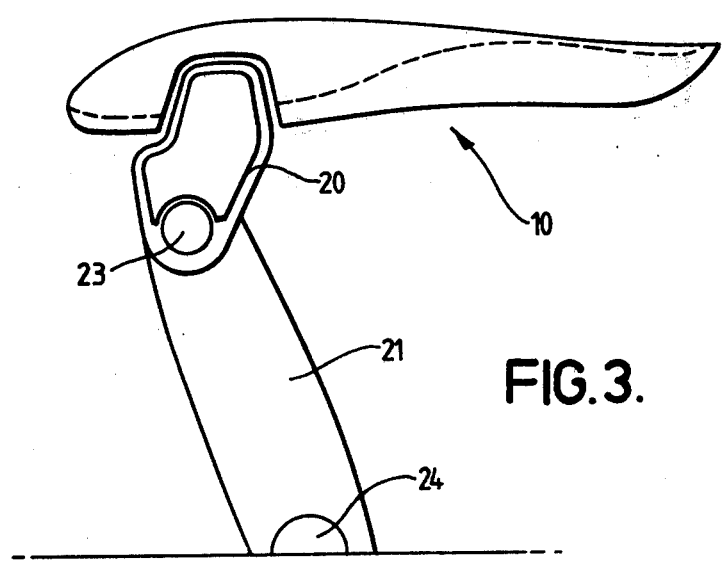
FIG. 3 is a diagrammatic side view of the airfoil device when positioned substantially horizontally to act as an airfoil.

Referring first to FIG. 1, the airfoil device comprises an aerofoil 10 having a leading edge 11 and a trailing edge 12 which as can be seen from the diagrammatic views of FIGS. 2 and 3 are substantially shaped in the form of a wing of an airplane. Each edge of the airfoil wing has a central section 13 to which it can be fixed to an arm for mounting on the roof of the cab of a tractor unit, a front section 14 which is inwardly inclined in the forward direction and a rear section 15 which is inwardly inclined in the backward direction.

The airfoil 10 has a pair of side portions 16 whose contour corresponds with that shown in full lines in the diagrammatic views shown in FIGS. 2 and 3. A central portion 17 has a much thinner cross section as shown in dotted lines in FIGS. 2 and 3. This reduction in the thickness of the aerofoil in the central section 17 is prominent particularly on the trailing edge which is very thin. Such reduction in material on the underside of the airfoil at the trailing edge in no way affects its performance as an airfoil, but has the advantage that the overall weight of the airfoil device is greatly reduced without affecting its rigidity.

Referring now to FIGS. 2 and 3, the airfoil 10 is secured to the gutterail on each side of the cab of the tractor (not shown) by means of a plate 20, an arm 21, a plate 22 and clamps (not shown). The arm 21 is provided with clampable pivots 23 and 24 at respective ends associated with the plates 20 and 22.

In the position shown in FIG. 2, the airfoil member 10 is inclined at approximately 45° to the horizontal and is used as an air deflector, the wind being deflected up and over the top of the trailer of the articulated tractor-trailer rig.

In the position shown in FIG. 3, the airfoil member 10 is substantially horizontal and is used as an airfoil. In this position the airfoil member 10 is arranged substantially above the roof of the cab of the tractor in order to direct the air flow substantially horizontally. In this position, it is used where either there is no trailer or the height of the trailer is less than the height of the cab of the tractor.

In the embodiment shown the airfoil member 10 is moved from one position to the other by pivoting the arms 21 relative to the side plates 22 about the pivot 24. The same effect could be achieved by pivoting the airfoil member about the pivot 23, except that the height of the airfoil member when in the position in which it acts as an airfoil would be much lower with respect to the roof of the cab of the tractor.

Furthermore, it would be possible to adjust both pivots so that the height of the airfoil member when acting as either a deflector or an airfoil could be adjusted to suit the height of the trailer. This arrangement would be particularly advantageous in the case where the tractor was used to convey trailers of greatly varying heights and having greatly varying drag characteristics.

Thus, it will be seen from the above description that the airfoil member is extremely versatile. In one case, where the tractor is being driven by itself or the height of the trailer is less than the height of the tractor (e.g. an empty trailer) the device acts purely as an airfoil to reduce drag. In a second case, it acts as an air deflector in order to reduce drag where a normal trailer load is being conveyed.

What I claim and desire to secure by Letters Patent is:

1. An air flow drag reducing member for use with a land vehicle pulling a trailer, said member having an airfoil shaped cross section and a longitudinal axis extending transversely across said vehicle roof, and including means for fixing the ends of said member to the roof of said vehicle, said member further comprising means for adjusting the inclination of said member between a horizontal position, in which said member acts to reduce drag in one of the cases wherein the roof of said trailer is lower than the roof of said vehicle, and wherein no trailer is being pulled, and an inclined position in which said member deflects air over the roof of said trailer.

2. The air flow drag reducing member according to claim 1, wherein said member has a leading edge and a trailing edge remote from and nearest to, respectively, said trailer, and two adjoining side portions having a central zone therebetween which is thinner in cross section toward said trailing edge, and which is thinner in cross section than said side portions.

3. The air flow drag reducing member according to claim 1, wherein said means for adjusting the inclination of said member comprise arms having upper and lower pivots at their respective ends adjoining the arms to said member and the roof of said vehicle, whereby said arms may be pivoted about said lower pivots to adjust the height of said member relative to said vehicle roof, and whereby said member may be pivoted about said upper pivot to adjust the inclination of said member relative to the horizontal.

* * * * *